Aug. 7, 1951 R. L. STONE 2,563,562
ELECTRIC MOTOR DRIVE
Filed Jan. 31, 1948 3 Sheets-Sheet 1
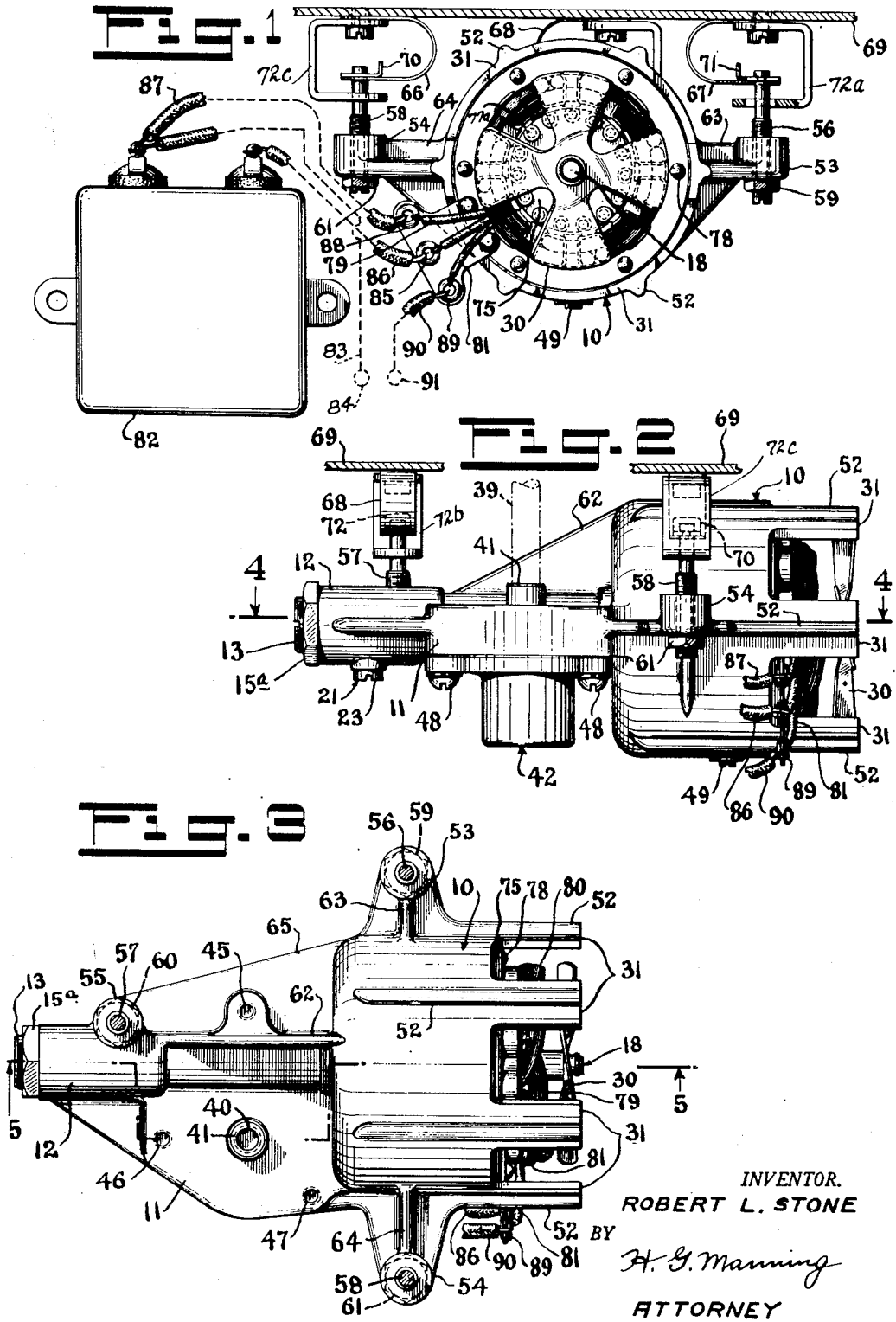
INVENTOR.
ROBERT L. STONE
BY H. G. Manning
ATTORNEY

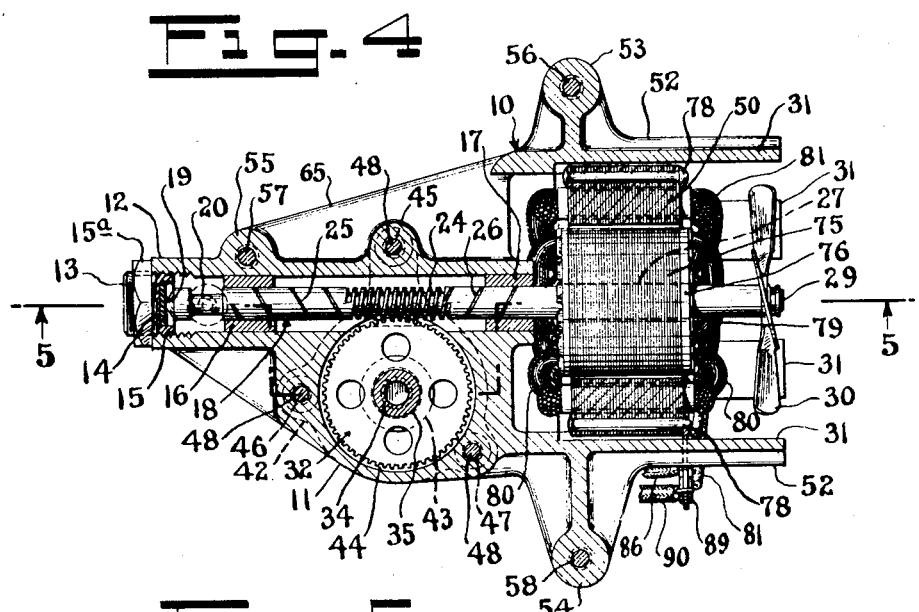

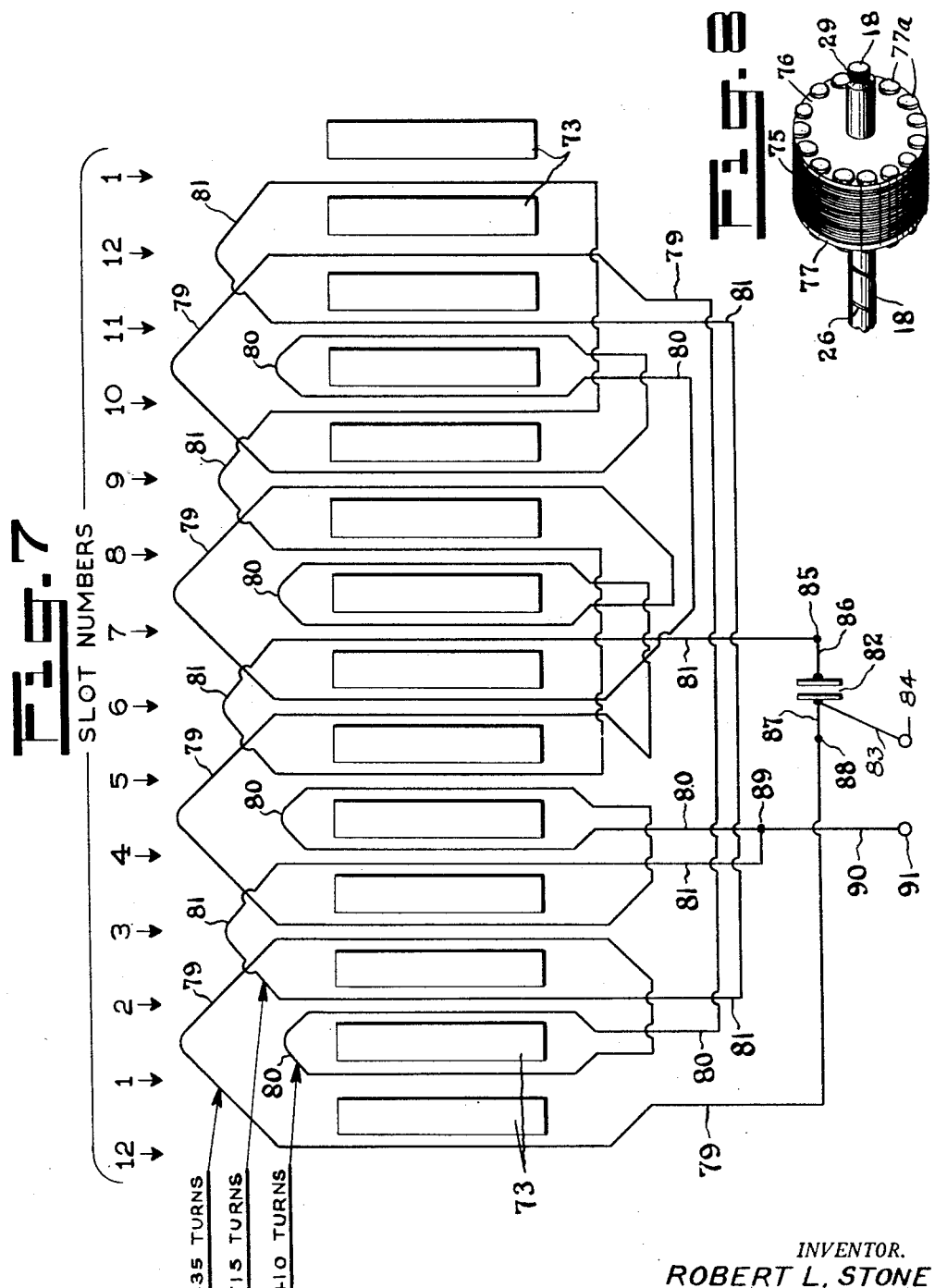

Patented Aug. 7, 1951

2,563,562

UNITED STATES PATENT OFFICE 2,563,562

ELECTRIC MOTOR DRIVE

Robert L. Stone, Guilford, Conn., assignor to The Soundscriber Corporation, New Haven, Conn., a corporation of Connecticut Application January 31, 1948, Serial No. 5,647

5 Claims. (Cl. 172—36)

This invention relates to electric motors and more particularly to a rapid-starting motor of the capacitor-induction type for use in driving the turntable of a phonographic dictating machine.

One object of the present invention is to provide a motor of the above nature having a grease-encased gear and worm drive, in which the motor and the worm and gear driving mechanism are mounted in two bearings located within a single casing having a depending grease reservoir.

A further object of the present invention is to provide an improved capacitor-induction motor in which a cooling fan is mounted in the motor frame, said fan being protected by a plurality of parallel arms projecting from said frame.

A further object is to provide a motor of the above nature, the casing of which is suspended from the chassis of the phonograph by means of a plurality of U-shaped springs.

A further object is to provide a motor which may be easily dismounted from the chassis merely by removing three clips therefrom.

A further object is to provide a motor of the above nature in which the worm shaft is provided at both ends of the worm with helical grooves to permit the flow of grease to the bearings of said shaft.

A further object is to provide a motor of the above nature in which the stator slots are made wide enough to permit the insertion of the stator coils radially from the center of said stator.

A still further object is to provide an improved rotor for a motor of the above nature, in which the copper conducting bars are located longitudinally in perforations in the end plates and interior laminations thereof to produce a quiet vibration-free construction.

Another object is to provide a motor of the above nature which will be simple in construction, light in weight, inexpensive to manufacture, easy to install and manipulate, compact, ornamental in appearance, and very efficient and durable in use.

With these and other objects in view, there has been illustrated on the accompanying drawing one form in which the invention may conveniently be embodied in practice.

In the drawings,

Fig. 1 represents an end view of the casing of the improved capacitor induction motor showing a section of the chassis of a phongraph dictating machine to which it is attached, and a capacitor electrically connected therewith.

Fig. 2 is a side view of the motor casing.

Fig. 3 is a top view of the same.

Fig. 4 is a longitudinal sectional view, taken along the line 4—4 of Fig. 2, looking in the direction of the arrows.

Fig. 5 is a longitudinal sectional view, taken along the line 5—5 of Figs. 3 and 4.

Fig. 6 is a fragmentary sectional view of one of the stator field laminations and the surrounding motor casing.

Fig. 7 is an electrical diagram of the motor circuits.

Fig. 8 is a perspective view of the rotor of the improved capacitor motor.

The present invention was designed to provide an electric motor for a phonographic dictation machine which would be easy to manufacture and assemble, and be relatively free from repairs and service difficulties.

In the early development of phonographs, electric motors were not capable of producing steady, vibration-free rotation of the disk turntable. The home phonograph of the early days generally employed a fly-ball governor to control the speed of the spring-wound motor, while in the commercial master-recording studios the speed was maintained by cumbersome weight-driven mechanisms. Subsequently, with the development of small electric power units, induction electric motors were employed for the operation of phonographs, but such motors were subject to considerable vibration, mechanical fluctuations, and "flutter" in the driving mechanism, and it was necessary to suspend the motor by complicated springs so that the vibrations would not reach the turntable structure. Moreover, friction roller drives were not suitable because of the roller slippage and vibration which was accentuated by the constant starting and stopping required in a dictating machine.

Most dictating machines in the past have employed clutches between the motor and turntable, but this construction had the disadvantage that the motor had to run continuously in order that the record could be clutched and unclutched therefrom.

Moreover, previous types of electric motors used to drive phonographic records could not bring the record to full speed in the short time interval expected by the dictator, who generally desired the machine to be ready for receiving his dictation without delay of any kind, after picking up the microphone.

By means of the present invention, the above and other disadvantages have been overcome, This has been accomplished by the use of the improved low-inertia high-starting torque inductance capacitor motor herein disclosed. With this motor a two pound turntable may be brought up to full speed in about $\frac{1}{10}$ of a second, and will be at rest except when dictation is being recorded. By means of this construction, not only is the wear and tear on the mechanism reduced, but service problems are greatly simplified.

A further advantage of the capacitor motor herein disclosed lies in the use of the built-in worm and gear drive by means of which the turntable may be driven at a speed of 33 R. P. M. by a rotor which may run at 1700 R. P. M.

A still further advantage of the improved capacitor motor is that brushes and moving contacts have been eliminated by the use of shaded poles and a capacitor circuit.

It will thus be seen that the improved capacitor induction motor herein disclosed is extremely simple, yet permits the desirable fast start for dictation convenience. It also eliminates vibration and noise due to the absence of troublesome belts, friction rollers, governors and clutches.

The rotor of the improved motor is built up from perforated laminations having no edge slots. Copper bars are laid in the perforations create short-circuiting turns, which are completed by copper end plates, as in the conventional squirrel cage rotor construction.

The stator has a 4-pole distributed winding with twelve teeth on the stator laminations, and is provided with three sets of coils. The first set of coils has four windings, each of which spans three adjacent teeth of the stator. Each coil of the second set of four windings spans the central tooth only of one of the first set of coils. Each coil of the third set interlinks the four polar sections and embraces two adjacent stator teeth—said set being in circuit with an external capacitor.

The first two sets of coils mentioned above are connected in series and supplied with power from a 110 volt A. C. line.

Referring now to the drawings in which like reference numerals denote corresponding parts throughout the several views, the numeral 10 indicates a motor casing of substantially cylindrical form, having a gear housing extension 11 provided with an open rear section 12, as most clearly shown in Figs. 4 and 5.

The extension 11 has a threaded end thrust bearing plug 13 within which is seated a fiber disk 14 located in a recessed seat 15 of said end plug 13, the latter being held in place by means of a lock nut 15a.

The extension 11 carries a pair of spaced cylindrical bearings 16, 17 for an elongated rotor shaft 18 having a convex end 19 which engages the end thrust bearing plug 13. The shaft 18 is provided with a groove 20 adjacent the end 19 for loosely receiving a transverse locking screw 21 having a reduced inner end 22 and a slotted outer head 23.

The rotor shaft 18 has formed thereon an intermediate driving worm section 24 which is connected at its ends with a pair of helical grease-conducting grooves 25, 26. The rotor shaft 18, as clearly shown in Fig. 5 is provided with an enlarged knurled section 27 for receiving a rotor 75 with a force fit.

A reduced knurled section 29 is also provided on the end of the motor shaft 18 for receiving a 4-bladed fan 30, which is protected by means of a plurality of parallel arms 31 integral with the motor casing 10.

The worm section 24 is adapted to drive a gear 32 meshing therewith and mounted on a vertical spindle-driving shaft 34 having a knurled section 35 in alignment with said gear for holding the latter rigidly in operating position by a force fit. The bottom of the shaft 34 is provided with an end thrust section 36 which engages a flat washer disk 37, and has a groove 38 above the bottom portion thereof to reduce friction and act as a grease-reservoir.

Provision is also made of an upper tapped extension 41 of the shaft 34 which is adapted to be connected to the spindle coupling 39 of a disk-supporting turntable of a dictating machine (not shown). The lower end of the spindle coupling 39 is provided with a threaded section 40 which is adapted to be screwed within the tapped extension 41.

In order to afford a permanent supply of lubricating grease to the gear 32 and worm section 24 at all times, and to avoid the necessity of replenishing the lubricant during the lifetime of the motor, provision is made of a depending grease cup 42 having an interior cylindrical bushing 43 located therein. The grease cup 42 is provided with an upper exterior flange 44 having shoulders to fit a circular section of the casing extension 11 and being secured thereto by means of three screws 48 located in screw holes 45, 46, 47 of said extension.

The casing 10 is also provided with a short set screw 49 (Fig. 5) to hold securely in place a laminated stator 50 (Fig. 6). The casing also has a plurality of interior lugs 51 for engaging the laminations 50, and said casing also has a plurality of longitudinal exterior strengthening ribs 52.

The motor casing 10 is adapted to be suspended within three mounting brackets 53, 54, 55 (Figs. 3 and 4) which are secured by screws 56, 57, 58 and nuts 59, 60, 61 to the chassis 69 of the dictating machine (Fig. 1).

The motor casing extension 11 is also provided with a wide longitudinal vertical strengthening web 62 and a pair of smaller vertical longitudinal webs 63, 64 at right angles to said web 62. A small horizontal side web 65 is also provided to further strengthen the construction.

In order resiliently to attach the motor to the chassis 69, a plurality of U-shaped springs 66, 67, 68 are provided, said springs being detachably connected to the screws 58, 56, 57, and to the brackets 54, 53, 55, respectively by a plurality of angular clips 70, 71, 72. Three rigid U-shaped stop brackets 72a, 72b, 72c are also provided to limit the downward movement of the motor casing.

The stator laminations 50 are each provided with twelve radial teeth 73 having enlarged inner ends 74—said teeth being adapted to embrace a laminated rotor 75 located therewithin and being spaced outwardly therefrom by air gaps 75a. The stator laminations 50 are rigidly connected together by longitudinal rivet bolts 78—six in number in this instance.

A pair of copper end plates 76, 77 serve to retain the rotor laminations in position (Fig. 8), said plates and laminations being perforated within the periphery thereof to receive a plurality of longitudinal copper bars 77a to create the usual short-circuiting turns in said rotor 75.

The arrangement of the three sets of stator coils is shown diagrammatically in Fig. 7, from which it will be seen that each coil 79 of the first set of four coils embraces three teeth and is located in the slots 12, 3; 3, 6; 6, 9; 9, 12, respectively. Each coil 80 of the second set embraces the center tooth of the set of three teeth 73 embraced by the coils 79. The small coils 80 of the second set are located in the slots 1, 2; 4, 5; 7, 8; 10, 11, respectively.

Each of the third set of four capacitor coils indicated by the numeral 81 embraces a pair of adjacent teeth 73 and is located in slots 2, 4; 5, 7; 8, 10; 11, 1, respectively. The coils 81 are connected in series and are joined at one end to a stator terminal 85 which is connected by a wire 86 to a capacitor 82 which in turn is connected by a wire 87 to a stator terminal 88.

The other end of the series of coils 81 is connected to a terminal 89 leading by a wire 90 to one line terminal 91. The terminal 87 is joined by a conductor 83 to the other line terminal 84.

While there have been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. An induction motor, a cylindrical casing, a horizontal driving shaft journaled in a pair of spaced bearings located at one end of said casing, a rotor mounted on the overhanging opposite end of said shaft, a worm formed on said shaft between said bearings, a vertical driven shaft mounted on an axis offset from said horizontal shaft and having a gear meshing with said worm, said gear being located in a chamber in said casing, a grease cup surrounding said driven shaft, said grease cup having a flange attached to said casing and closing said chamber, said driving shaft having helical grooves connected with said worm to permit the grease to pass along said shaft for lubricating said bearings.

2. The invention as defined in claim 1, in which said driving shaft carries a cooling fan on the extremity of its overhung end.

3. The invention as defined in claim 1, in which said driving shaft is provided with a reduced section at one end within which is located a transverse stop pin extending inwardly from said casing.

4. In an induction motor, a cylindrical casing, a horizontal driving shaft journaled in a pair of spaced bearings located at one end of said casing, a rotor mounted on the overhanging opposite end of said shaft, a worm formed on said shaft between said bearings, a vertical driven shaft mounted on an axis offset from said horizontal shaft and having a gear meshing with said worm, a grease cup surrounding said driven shaft, said driving shaft having helical grooves connected with said worm to permit the grease to pass along said shaft for lubricating said bearings, said driving shaft carrying a cooling fan on the extremity of its overhung end, and said casing being enlarged at the end surrounding said rotor and longitudinally slotted to enhance the cooling effect of said fan.

5. In a motor, a cylindrical casing, a horizontal driving shaft journaled in a pair of spaced bearings located at one end of said casing, a rotor mounted on the over hanging opposite end of said shaft, a worm formed on said shaft between said bearings, a vertical driven shaft mounted on an axis offset from said horizontal shaft and having a gear meshing with said worm, a grease cup surrounding said driven shaft, said driving shaft having helical grooves connected with said worm to permit the grease to pass along said shaft for lubricating said bearings, said driving shaft carrying a cooling fan on the extremity of its overhung end, said casing being enlarged at the end surrounding said rotor and longitudinally slotted to enhance the cooling effect of said fan, and said casing having a plurality of inwardly extending lugs for engaging said stator to hold it securely in operating position.

ROBERT L. STONE.

REFERENCES CITED

The following references are of record in the file of this patent:

UNITED STATES PATENTS

| Number | Name | Date |
| --- | --- | --- |
| 677,909 | Wood | July 9, 1901 |
| 744,145 | Wiard | Nov. 17, 1903 |
| 918,574 | Mayo et al. | Apr. 20, 1909 |
| 1,201,362 | Shelton | Oct. 17, 1916 |
| 1,375,461 | Kinble | Apr. 19, 1921 |
| 1,580,682 | Sandell | Apr. 13, 1926 |
| 1,688,847 | Aufiero | Oct. 23, 1928 |
| 1,780,395 | Kennedy | Nov. 4, 1930 |
| 1,823,555 | Naul | Sept. 15, 1931 |
| 1,875,205 | Apple | Aug. 30, 1932 |
| 1,924,103 | Bisschop | Aug. 29, 1933 |
| 1,979,425 | Van der Woude | Nov. 6, 1934 |
| 2,053,425 | Else | Sept. 8, 1936 |
| 2,152,112 | Tornberg | Mar. 28, 1939 |
| 2,176,118 | Brinda | Oct. 17, 1939 |
| 2,306,743 | Morrill | Dec. 29, 1942 |